(12) United States Patent
Holdsworth et al.

(10) Patent No.: US 11,262,252 B2
(45) Date of Patent: Mar. 1, 2022

(54) WIRELESS CAPACITIVE LOAD CELL DEVICE

(71) Applicants: David Wayne Holdsworth, London (CA); William Douglas Anderson, Toronto (CA); Sydney Lauren Molloy Wilson, Newmarket (CA)

(72) Inventors: David Wayne Holdsworth, London (CA); William Douglas Anderson, Toronto (CA); Sydney Lauren Molloy Wilson, Newmarket (CA)

(*) Notice: Subject to any disclaimer, the term of this patent is extended or adjusted under 35 U.S.C. 154(b) by 118 days.

(21) Appl. No.: 16/810,554

(22) Filed: Mar. 5, 2020

(65) Prior Publication Data
US 2021/0278294 A1 Sep. 9, 2021

(51) Int. Cl.
*G01L 1/14* (2006.01)
*G01L 5/1627* (2020.01)

(52) U.S. Cl.
CPC ............. *G01L 1/144* (2013.01); *G01L 1/146* (2013.01); *G01L 5/1627* (2020.01)

(58) Field of Classification Search
CPC ..... B06B 1/0292; G01L 1/144; G01L 5/1627; G01L 1/146
USPC .......................................................... 73/780
See application file for complete search history.

(56) References Cited

U.S. PATENT DOCUMENTS

| | | | | |
|---|---|---|---|---|
| 6,104,100 A * | 8/2000 | Neuman | ............ | G01G 19/4142 307/10.1 |
| 7,263,896 B2 * | 9/2007 | Bonin | ...................... | G01B 7/22 73/781 |
| 7,673,530 B2 * | 3/2010 | Harish | ...................... | G01G 7/06 73/862.626 |
| 8,453,498 B2 * | 6/2013 | Warren | .................. | G01Q 30/02 73/105 |
| 2006/0267321 A1 * | 11/2006 | Harish | .............. | B60R 21/01516 280/735 |

* cited by examiner

*Primary Examiner* — Octavia Hollington
(74) *Attorney, Agent, or Firm* — Brunet & Co. Ltd.; Robert Brunet; Hans Koenig

(57) ABSTRACT

The wireless capacitive load cell features a two-component strain member has a spring body and force transduction plate, which deforms when a load is applied to the structure. During loading, the force transduction plate moves the cantilever spring body out of a position of rest, which results in an indenter, located within the force transduction plate, contacting a capacitive transducer. The capacitive transducer converts deformation of the strain member into an electrical signal which is correlated to a specific load value. The microelectromechanical system that accompanies the capacitive transducer processes and prepares the signal for wireless transmission. The microelectromechanical system has a capacitive transducer, signal conditioner, microcontroller unit, and telemetry system. Additional embodiments of the wireless load cell may include acceleration and temperature sensors embedded within the microelectromechanical system. The spring body features hard stops to prevent excessive deformation which can be harmful to the capacitive transducer.

10 Claims, 6 Drawing Sheets

WIRELESS CAPACITIVE LOAD CELL DEVICE

REFERENCE TO RELATED APPLICATIONS

N/A

FIELD OF THE INVENTION

This application relates to a wireless capacitive transducer embedded within a deformable strain member for performing load measurements. More particularly, the invention relates to a wireless load cell that transduces deformation of a spring body into an electrical signal, and subsequently an applied load to measure the forces acting on the structure.

BACKGROUND

Load measurements are performed in a range of applications as a method of evaluating the forces applied to a structural element. Traditional load cells utilize strain gauge technology adhered to the surface of a strain member, which is commonly fabricated in metal, to measure applied forces. When subjected to loading, the strain member deforms and the change in deformation is transduced by the strain gauge system and internally converted to load data. Conventional strain gauges share a common design; the difference in load capacity between packages can be attributed to variations in the physical design of the deformable strain member. Strain gauge-based load cells are limited in their ability to measure forces in small-scale applications and remote environments due to the size of the components in the system. Traditional strain gauges require a wired cable to power the sensors, acquire data, and transfer data back to an acquisition system. Wired packages can pose a problem in remote applications, as wires can interfere and become tangled in each other. For example, a conventional strain gauge-based load sensor could not be easily embedded within an orthopaedic implant, as the wired technology would pose several issues regarding functionality and patient safety. As well, wires used in dynamic applications may wear and have to frequently be replaced. Due to these concerns, and the advancements in microelectromechanical miniaturization, there is an incentive to develop miniature, wireless, low-power load cells.

While many wireless load cells have been successful in a variety of applications, several deficiencies remain. Wireless strain-gauge systems require additional components beyond the strain gauge, such as signal processing equipment and a radiofrequency (RF) transmitter. The size of the signal-conditioning equipment, RF transmitter, and power source significantly increases the overall volume of the sensor package. This eliminates wireless strain gauge-based sensor packages from many small-scale applications. In addition, many wireless strain gauge-based load packages require a significant current draw. Therefore, a large capacity power source is required to accompany the sensor package. This presents a challenge in remote, difficult to reach applications, as the power source would have to be frequently replaced. Other deficiencies of wireless strain gauge-based load cells include an inability to measure other variables aside from load, and the unidirectionality of data transfer (such that the sensor package cannot receive external commands).

Recent advancements in the field of automotive sensor design, specifically microelectromechanical based technology, have made alternative methods of load transduction feasible for use in wireless load sensing packages. Capacitive pressure transducers have been tasked to monitor air pressure in vehicle tires to alert drivers of tire deflation and to prevent future road accidents. Such transducers are known from U.S. Pat. No. 9,772,245 B2, where two electrode plates are held parallel to each other in a position of rest when in a neutral environment. When subjected to an increased air pressure, the electrode exposed to the environment, also known as the diaphragm, deflects towards the reference electrode, which is held in a fixed position. The capacitance changes in proportion to the distance between the two electrodes and the output electric signal is correlated back to useful data through calibration measurements. The displacement capacity of the electrode plates is limited by the distance between the plates and overloading beyond the maximum distance between the electrodes will result in destruction of the capacitive transducer. Automotive capacitive pressure transducers have recently been embedded within microelectromechanical systems, which feature an onboard microcontroller, signal processing equipment, RF transmitter, low frequency (LF) receiver, as well as an accelerometer and temperature sensor. The FXTH87 tire pressure sensor developed by NXP Semiconductors is one example of a miniature package comprised of all of the features previously mentioned. These small-scale packages have ultra-low power consumption, which makes them an ideal solution to long term sensing applications. Prior to the development of miniature capacitive pressure transducers, load cells have been developed by embedding a variety of capacitive transducers within deformable bodies. While these packages are effective in certain applications, they are not feasible for use in small-scale applications where wireless measurements are required.

U.S. Pat. No. 4,750,082 A discloses a load cell, which utilizes a capacitive potentiometer to convert displacement of parallel electrode plates into an electrical signal. The capacitive load cell is not wireless and would require wires for power supply, data acquisition, and signal conditioning. The package contains no additional miniature sensors or telemetry link. The capacitive transducer is not coated with an elastomeric material to couple the external plate of the transducer to an indenter.

U.S. Pat. No. 4,295,376 A discloses a force transducer, which uses a capacitive transducer to convert a force, and subsequent displacement, to an electrical signal. The capacitive transducer features a deflectable diaphragm, which deforms when subjected to a pressure or load. As the space between the diaphragm and reference electrodes decrease the output signal value increases. The force transducer is not wireless and would require a cable for power supply and data acquisition. The system does not include a telemetry system, signal conditioner, microcontroller unit, and additional sensors.

U.S. Pat. No. 9,335,226 B2 discloses a load cell, which is comprised of a spring body and capacitive displacement transducer. This load cell converts deformation of the spring body into an electrical signal. The capacitive displacement transducer utilizes two electrode combs, each featuring multiple electrode fingers. The combs are mounted parallel to each other on carrier parts of the spring body. As a load is applied, the electrode combs move into the interspaces of the fingers of the opposing comb, which results in a change in signal value. The capacitive displacement transducer is not part of a microelectromechanical system that comprises of a signal conditioner, microcontroller unit, telemetry system, and additional sensors. This load cell would require a wired cable for a power supply and data collection.

U.S. Pat. No. 4,463,614 A discloses a force transducer that utilizes a parallel plate capacitor to convert a force into an electrical signal. When force is applied to the structure surrounding the sensor, the beam members deform, which directly displaces the sensing members all while maintaining parallel orientation to each other. The force transducer does not include additional sensors and signal processing components and must be wired for signals to be acquired.

U.S. Pat. No. 7,159,471 B2 discloses a parallel plate capacitive load cell apparatus that measures weight applied to a vehicle seat and records the associated load. The described capacitive sensor has a silicone layer separating the upper and lower capacitor plates, which decreases humidity related variability. The package is a wired capacitive transducer and features no additional spring body, sensors, signal conditioner, micro controller, or telemetry system.

Specialized capacitive force transducers have been previously described for a wide range of applications (Miyazaki 1984; Wiegerink 2000; Yu 2005; Kim 2009; Salpayaara 2009; Muhammad 2011; Mentink 2017), but no small-scale wireless package is available for measurement, processing, and transmission of an applied load. Ideally, the sensor, signal conditioner, and telemetry system would all be combined within a single component to minimize size. In addition, the surrounding spring body should be customizable so that the capacitive transducer can measure various ranges of applied loads.

Features present in the recently developed automotive microelectromechanical capacitive pressure transducers counteract the deficiencies of existing strain gauge-based and capacitive-based load cells. These capacitive pressure sensing packages are wireless, miniature, and have ultra-low power consumption, however, these packages are limited to pressure sensing and have yet to be shown to be an effective method of measuring load. It is feasible that with adjustments to the design of the capacitive pressure transducer and a supporting deformable strain member to interact with the transducer diaphragm, a successful miniature wireless load cell can be developed.

SUMMARY OF THE INVENTION

The present invention is to create a wireless load cell which can be used to transduce a force into an electrical signal, which can be processed and transmitted. More particularly, a capacitive transducer capable of detecting a change in deformation of a force transduction plate, upon an applied load to a cantilever spring body, into an electrical capacitance, which can be processed and transmitted wirelessly in units of load.

In order for a capacitive pressure transducer to measure loads, it can be modified to withstand and measure deformation from a strain member, similar to how conventional strain gauge-based systems operate. This involves altering the design of the capacitive pressure transducer to couple the surface of the transducer diaphragm to the body of a strain member. A custom strain member c also be designed to deform under various loading conditions without damaging the capacitive pressure transducer through overloading.

The invention consists of a capacitive transducer and may consist of a series of miniature sensing elements such as an accelerometer and temperature sensor, all fabricated into a microelectromechanical device. The microelectromechanical package features a signal conditioning system, which further consists of a bi-directional wireless telemetry system. One embodiment of said microelectromechanical system may contain the FXTH87 tire pressure sensing package. The embedded signal-conditioning system is capable of converting raw signal data from the capacitive transducer, accelerometer, and temperature sensor to a signal compatible for processing. The microcontroller unit processes all the digital measurements at periodic intervals, potentially stores the data in on-board memory, and packages it for appropriate wireless transmission and reception. In the most robust embodiment of this system, the sensor package may include additional sensing elements such as, but not limited to, an acceleration sensing element and temperature sensing element. These additional components allow for information regarding changes in velocity and orientation of the wireless load cell over time, as well as the temperature of the surrounding environment.

The described microelectromechanical device, featuring a capacitive transducer, signal conditioning system, microcontroller, and in some embodiments one or more additional sensing elements, is embedded within a two-component spring body. The spring body comprises of a force transduction plate and a deformable structure composed of one or more cantilever beams. The inferior surface of the force transduction plate interacts with the superior surface of the unfixed end of each cantilever beam. When load is applied to the superior surface of the force transduction plate, the load is transduced through the plate and acts on the unfixed end of each cantilever beam. The orientation of the cantilever beams with respect to the force transduction plate results in the force transduction plate deforming vertically along the same axis as the applied force. The force transduction plate houses an adjustable indenter, the displacement of said indenter is coupled with the vertical motion of the transduction plate. The inferior most surface of said indenter can be precisely adjusted to interact with the external surface of the capacitive transducer diaphragm. This system allows an applied load to deform a spring body which is coupled to a microelectromechanical system consisting of a capacitive transducer.

The delicate nature of the external surface of miniature capacitive transducers makes them easily susceptible to damage. In addition, displacement of the transducer diaphragm of conventional small-scale capacitive transducers does not typically occur via a physical indenter. To counteract these problems, a stiff elastomeric material can be applied to the external surface of the capacitive transducer. Said elastomeric material may be Sylgard 184, a two-part silicone elastomer developed by The Dow Chemical Company. The presence of an elastomer couples the transducer diaphragm of the parallel plate capacitive sensor to the adjustable intender housed in the force transduction plate. This also allows the force transduction plate, adjustable indenter, and transducer diaphragm to move in unison.

At rest, the electrical capacitance of the transducer is low, as the parallel electrode plates of the capacitive transducer are held at their maximum distance apart. Upon loading of the cantilever spring body, the space between the transducer diaphragm and reference electrode decrease and the electrical capacitance of the transducer increases, corresponding to the applied force. Preferably, the maximum deformation of the spring body, and subsequently the force transduction plate, is less than the distance between the parallel offset of the electrode plates. In order to make this possible, the spring body is designed to prevent overloading of the capacitive transducer with a built-in hard stop at the fixed end of each cantilever beam.

The capacitive transducer simply converts deformation into an electrical signal. To convert the output signal into a unit of load, the capacitive transducer can be calibrated while it is embedded within a spring body. During calibration, a correlation can be drawn between the direct load applied to the spring body and the digitized output electrical signal from the capacitive transducer.

The two-component cantilever spring body is designed to deform no more than the displacement capacity of the parallel plate capacitive transducer. Therefore, the capacitive transducer can reasonably sustain any load, with the reported measurements clipped at the load required to achieve full displacement of the force transduction plate to the hard stop. In the spring body, the fixed ends of the cantilever beams prevent the force transduction plate and indenter from destructive deformation of the capacitive transducer. With this in mind, the load capacity of the wireless load cell is solely based on the design and fabrication of the cantilever spring body. The length, width, and height of the cantilever beam directly affects the amount of force required to deflect the beams. Similarly, the material used in fabrication of the cantilever strain body will also influence the force required to deflect the beams. A spring body fabricated in metal will result in a wireless load cell with a higher load capacity than a spring body fabricated in plastic, primarily as a result of metals having a larger young modulus in comparison to plastic materials. Using a combination of cantilever beam design and fabrication materials, the cantilever spring body, which further encompasses a wireless load transducer, can be customized to measure a wide range of applied loads.

BRIEF DESCRIPTION OF THE DRAWING

In order to further describe the invention, embodiments will be presented in detail, with reference to accompanying drawings, in which.

DETAILED DESCRIPTION OF THE INVENTION

Figure 1:
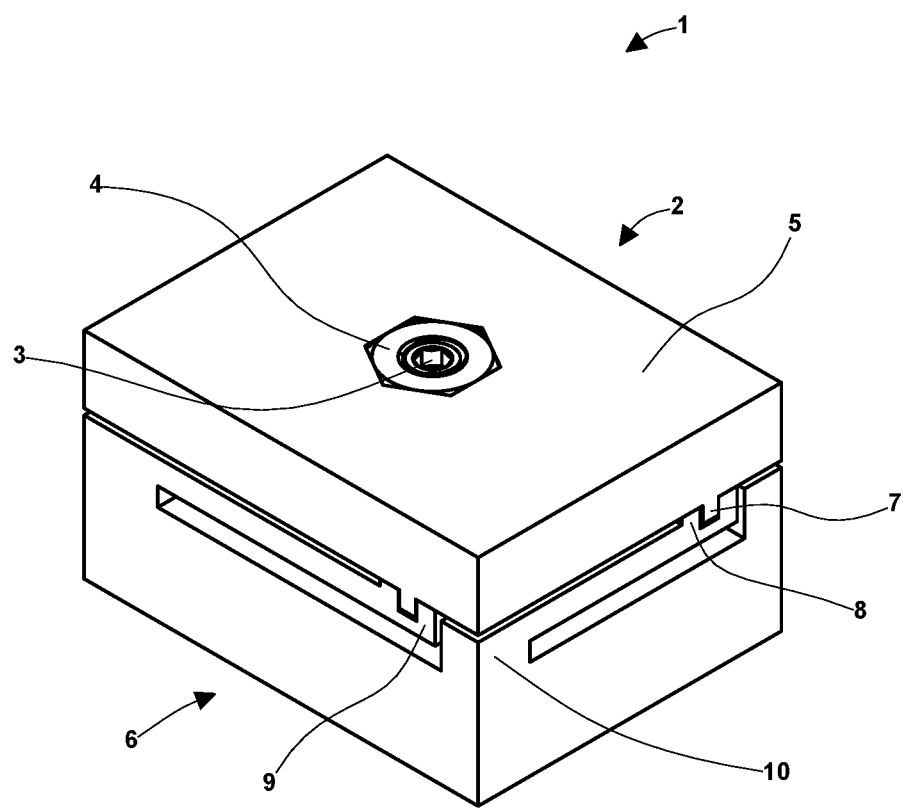
FIG. 1 depicts a schematic drawing of one embodiment of the wireless load cell, the system comprising a spring body, further consisting of a force transduction plate and indenter components.

FIG. 1 depicts a schematic drawing of one embodiment of a wireless load cell 1. The wireless load cell 1 consists of a force transduction plate 2, which is coupled with a spring body 6 featuring cantilever beams. The force transduction plate may comprise of a nut 4 and ball-point set screw 3, as well as an extruded male component 7. The ball-point set screw 3 acts as an adjustable indenter, which interacts with the surface of a capacitive transducer while the extruded male component 7 interacts with the spring body 6. The spring body 6 may comprise of one or more cantilever beams, as well as an indentation into the unfixed end of the cantilever beams 9, which acts as a female component 8. The male component of the force transduction plate 7 interacts with the female component 8 on the unfixed end of the cantilever beams in the spring body 9. In the current embodiment, load is applied to the superior surface of the force transduction plate 5. The applied load vertically displaces the force transduction plate 2 onto the unfixed end of the cantilever beams 9 in the spring body 6 due to coupling of the male component on the force transduction plate 7 and the female component on the end of each cantilever beam 8. The applied load required to displace the force transduction plate 2, and subsequently the cantilever beams of the spring body 6, depends on the material used in fabrication of the spring body 6. A spring body 6 fabricated in metal will require more applied load to deform, than a structure made out of plastic. The fixed end of the cantilever beams 10 restrict the displacement of the force transduction plate 2. This prevents the indenter component 3 in the force transduction plate 2 from deforming more than the capacity of the capacitive transducer, which may result in irreparable damage.

Figure 2:
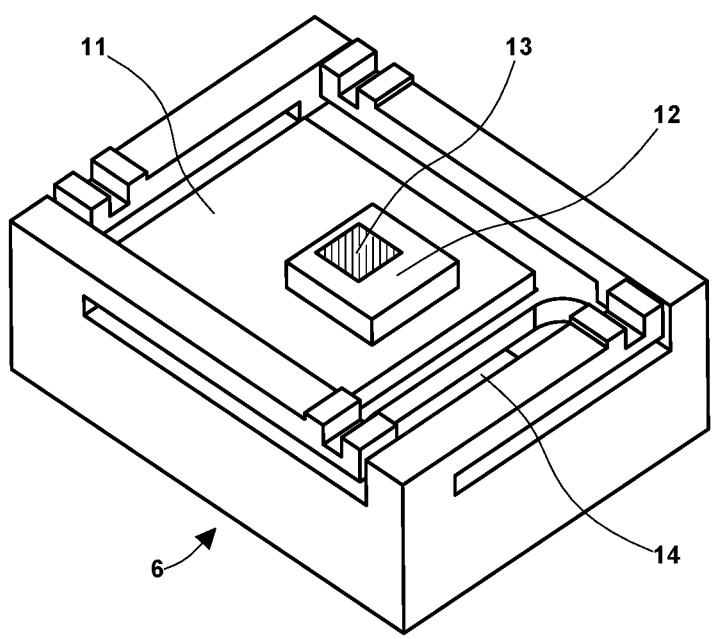
FIG. 2 depicts a schematic drawing of one embodiment of the wireless load cell, the system comprising a spring body and microelectromechanical system.

FIG. 2 depicts a schematic drawing of a wireless load cell 1 without the force transduction plate 2 to illustrate the internal features of the wireless load cell 1. A circuit board 11 and microelectromechanical system 12 are embedded within the confines of the cantilever beams of the spring body 6. The circuit board 11 may act as a link between a power source and the microelectromechanical system 12 and may provide any supporting electrical circuitry for the functioning of the microelectromechanical system 12. The microelectromechanical system 12 may comprise of a capacitive transducer, one or more accelerometers, one or more temperature sensors, one or more signal conditioners, telemetry system, and microcontroller. An FXTH87 tire pressure sensor may be the microelectromechanical system in one embodiment of the wireless load cell. The external surface of the capacitive transducer in 12 may be coated with an elastomer 13 to help couple the indenter to the transducer diaphragm of the capacitive transducer. One embodiment of the invention may contain Sylgard 184 as the elastomeric material 13. The spring body 6 described in FIG. 1 may also comprise of a through hole 14, which allows for a battery source to be stored beneath the circuit board 11 to minimize size. The through hole 14 could allow small wires to connect the power source to the circuit board 11, and subsequently the microelectromechanical system 12.

Figure 3:
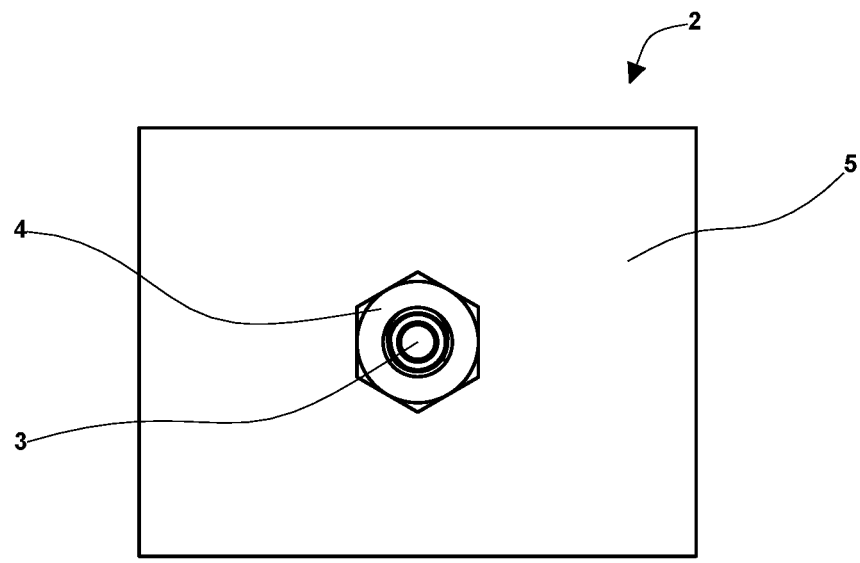
FIG. 3 depicts a schematic drawing of a top view of a spring body, and further, a force transduction plate in the wireless load cell of FIG. 1.

FIG. 3 depicts a schematic drawing of the top view of the force transduction plate 2, described in FIG. 1. The force transduction plate 2 may consists of a nut 4 and set screw 3, which act as an adjustable intender that contacts the elastomer surface 13 of the capacitive transducer of the microelectromechanical system 12 described in FIG. 2. In the current embodiment, the indenter is located in the center of the superior surface 5 of the force transduction plate 2, which matches the central location of the microelectromechanical system 12 mounted within the spring body 6.

Figure 4:
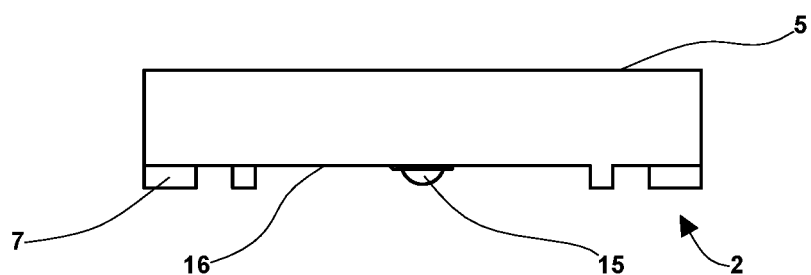
FIG. 4 depicts a schematic drawing of a side view of a force transduction plate in the wireless load cell of FIG. 1.

FIG. 4 depicts a schematic drawing of the side view of the force transduction plate 2, described in FIG. 1 and FIG. 3.

The male fingers 7 that extrude from the inferior surface 16 of the force transduction plate 2 interact with the female component of the cantilever beams, as described in FIG. 1. In the current embodiment, the contact surface of the adjustable indenter 15 extends beyond the inferior surface 16 of the force transduction plate 2. This ensures that only the tip of the adjustable indenter 15 comes into contact with the elastomer surface of the capacitive transducer 13 within the microelectromechanical system 12. The inferior surface 16 of the force transduction plate 2 stops the vertical displacement of the plate when it contacts the fixed end of the cantilever beams 10, as described in FIG. 1.

Figure 5A:
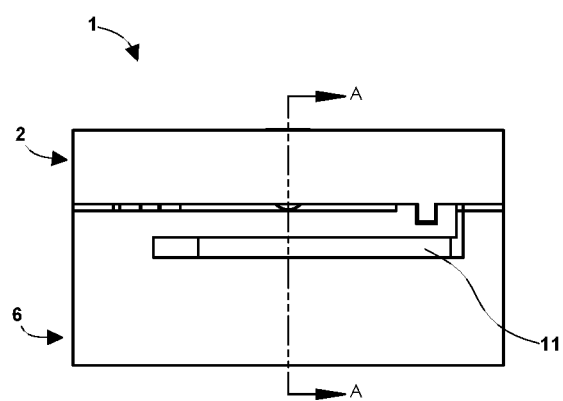
FIG. 5A depicts a schematic drawing of a side view of the wireless load cell in FIG. 1.

FIG. 5A depicts a schematic drawing of the side view of a wireless load cell 1. The wireless load cell 1 consisting of a force transduction plate 2 and spring body 6, as well as a circuit board 11 and microelectromechanical system 12, was described in FIG. 2. The circuit board 11 is oriented within the spring body 6 to ensure that the indenter in the force transduction plate 2 contacts the surface of the capacitive transducer of the microelectromechanical system 12.

Figure 5B:
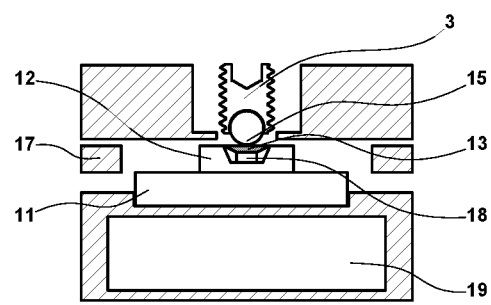
FIG. 5B depicts a schematic drawing of a cross-section through A-A of the wireless load cell of FIG. 5A.

FIG. 5B depicts a schematic drawing of a cross section slice through A-A of the wireless load cell 1 of FIG. 5A. The circuit board 11 and microelectromechanical system 12 are oriented within the spring body to be directly below the ball-point set screw 3 embedded in the force transduction plate 2. In every embodiment of the wireless load cell 1, the microelectromechanical system 12 consists of a capacitive transducer 18. The external surface of the capacitive transducer 18 is coated with an elastomer 13 to couple the capacitive transducer to the contact surface of the adjustable indenter 15. In the current embodiment, when a load is applied to the force transduction plate 2, the force is passed through the plate onto the cantilever beams 17 of the spring body 6, which then deforms said cantilever beams. Subsequently, the force transduction plate 2 and indenter 3 is vertically displaced onto the elastomeric coating 13 and capacitive transducer 18 within the microelectromechanical system 12. In the current embodiment, the wireless load cell 1 can be calibrated to measure load by evaluating the relationship between the output signal values from the capacitive transducer 18, the deformation of the spring body 6 and force transduction plate 2, and the load that was applied to the surface of the enclosure 5. The circuit board 11 and microelectromechanical system 12 can be powered through a power source which may be placed in the cavity 19 beneath the circuit board 11, all within the confines of the spring body 6. This ensures the wireless load cell 1 maintains its small size while not compromising the functionality of the spring body 6.

Figure 6:
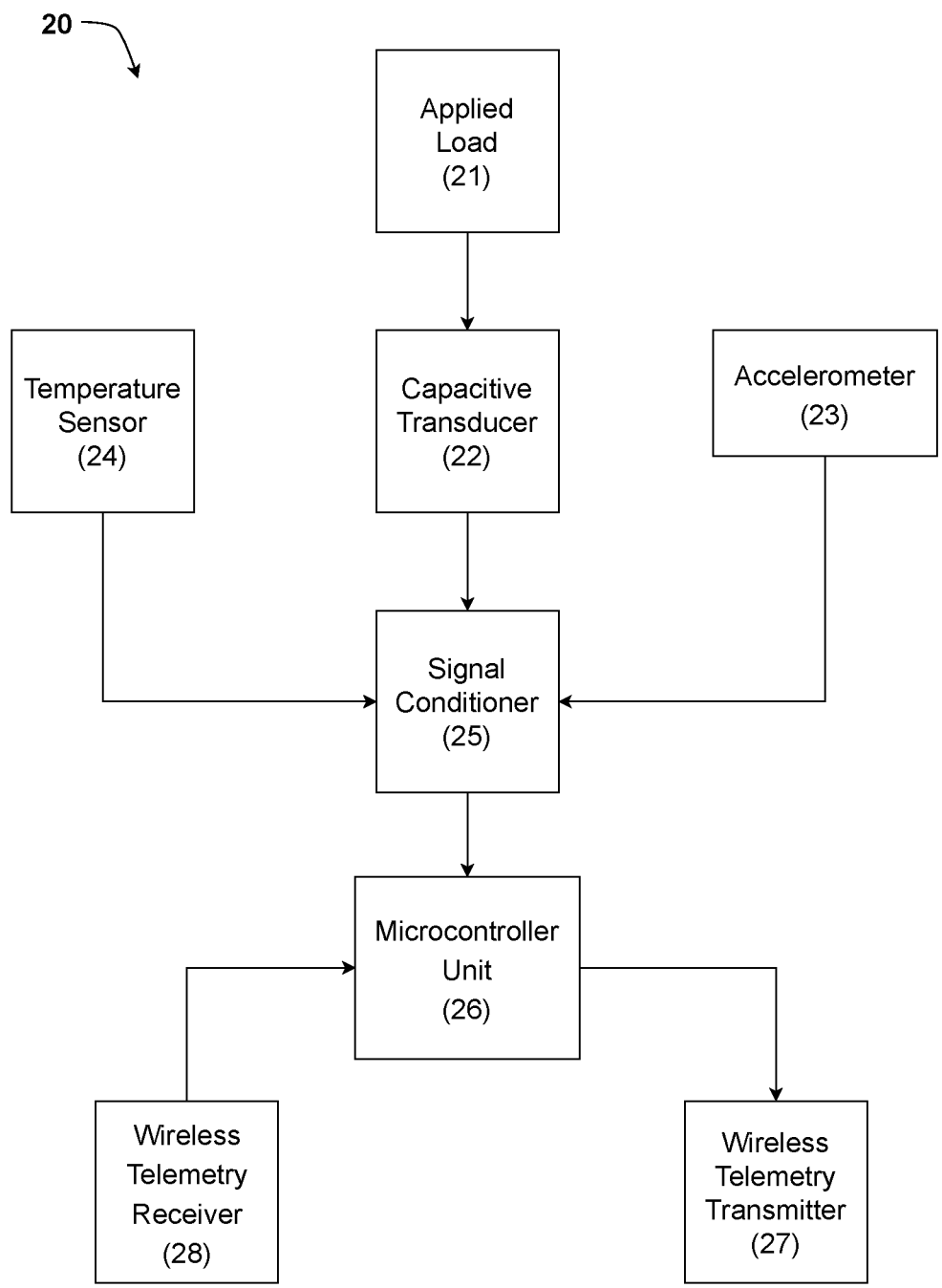
FIG. 6 depicts a block diagram illustrating the most robust embodiment of a system implementation for a combined capacitive transducer, accelerometer, and temperature sensor system of the present invention.

FIG. 6 depicts a block diagram illustrating an embodiment of the system used in a wireless load cell. The block diagram shows the relationship between the components which make up the microelectromechanical system embedded within the wireless load cell 20. When a load 21 is applied to the wireless load cell it deforms the cantilever beams of the spring body and displaces the force transduction plate and indenter onto the capacitive transducer 22. The output signal corresponding to the specific amount of displacement is sent to a signal conditioner 25 to convert the analog signal to a digital signal. This process prepares the signal to be processed downstream. In a more robust embodiment of the wireless load cell, accelerometers 23 and temperature sensors 24 may also send output analog signals to the signal conditioner 25 for conversion to a digital format. The digital signals are processed by a microcontroller unit 26 and prepared for wireless transmission. The signals are then sent to a wireless telemetry transmitter 27 and then received in an external user interface for the wireless load cell. In some embodiments, the wireless load cell may also comprise of a wireless telemetry receiver 28. This would allow commands from the user interface to be sent to the microcontroller 26 in the wireless load cell. Example commands may enable or disable sensor acquisition and alter data transmission frequency in order to conserve the length of the power supply. In one embodiment of the invention, the microelectromechanical system may be an FXTH87 tire pressure sensor. The FXTH87 package features a capacitive transducer 22, accelerometer 23, temperature sensor 24, signal conditioner 25, micro controller unit 26, as well as a wireless telemetry transmitter 27 and receiver 28.

Figure 7:
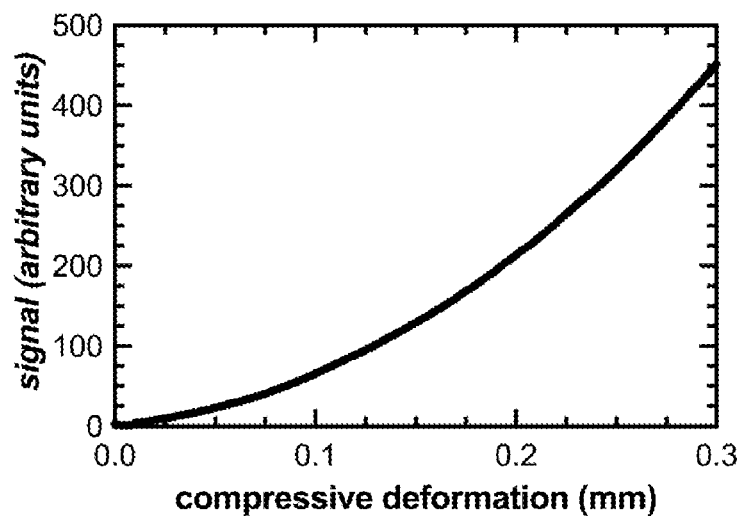
FIG. 7 depicts a graph of output signal value (arbitrary units) vs. compressive deformation (mm) showing experimental results from a test evaluating the response of the capacitive transducer when subjected to applied deformation.

FIG. 7 depicts a graph of output signal value (arbitrary units) vs. compressive deformation (mm) showing the experimental results of a test designed to evaluate the response of the capacitive transducer when it was subjected to applied deformation. For this experiment, to simulate its function in the wireless load cell 1, an elastomer 13 was applied to the surface of the capacitive transducer 18, as illustrated in FIG. 5B. Compressive deformation was applied to the capacitive transducer using an indenter very similar to the indenter used in the design of the wireless load cell 1. The capacitive transducer 18 in the wireless load cell 1 measures the deformation of the spring body 6 in response to an applied load. The results of this experiment determine the response curve of the electrical signal output when subjected to deformation as well as the maximum amount of the compressive deformation that can be applied to the transducer. The output signal from the capacitive transducer increased as more compressive deformation was applied. While compressive deformation was linearly applied, the signal response of the capacitive transducer was not linear. However, the signal profile was very repeatable between trials, which makes calibration of the capacitive transducer possible. The capacitive transducer used in this experiment had a compressive deformation capacity of approximately 0.3 mm. When the spring body 6 is at rest, the distance between the inferior surface of the transduction plate 16 and fixed ends of the cantilever beams 10, as described in FIG. 4, should be consistent with the maximum deformation capacity. The deformation limits may depend on the specifications of the capacitive transducer, as well as the amount and stiffness of the elastomer applied to the surface of the capacitive transducer.

Figure 8:
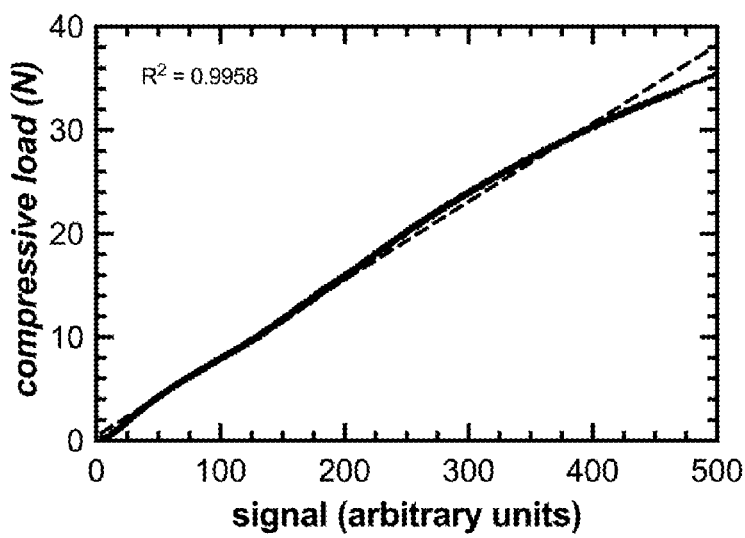
FIG. 8 depicts a graph of compressive load (N) vs. output signal value (arbitrary units) showing experimental results from a calibration of one embodiment of the wireless load cell.

FIG. 8 depicts a graph of compressive load (N) vs. output signal value (arbitrary units) showing the experimental results of a calibration of the wireless load cell 1, which was described in FIG. 1. In the experiment, compressive load was applied to the wireless load cell, which deforms the spring body and displaces the force transduction plate and indenter onto the surface of the capacitive transducer. The magnitude of compressive load was gradually increased to ensure full deformation of the spring body and force transduction plate. When incremental force was applied to the wireless load cell, the output signal value from the capacitive transducer increased. The results from the graph in FIG. 8 show that the received signal value from the capacitive transducer can be correlated to a specific load value applied to the spring body. While the wireless load cell used in calibration could only measure loads of up to 35 N, alterations to the design of the cantilever beams and the materials used to fabricate the spring body could increase or decrease the load capacity of the wireless load cell.

REFERENCES

Kim, Y., et al. (2009). "Silicon-based Capacitive Load Cell for Tensile Load Measurement." 2009 *Symposium on Design, Test, Integration & Packaging of MEMS/MOEMS*.

Mentink, M. J. A., et al. (2017). "A novel flexible capacitive load sensor for use in a mobile unicompartmental knee replacement bearing: An in vitro proof of concept study." *Med Eng Phys* 46: 44-53.

Miyazaki, S. and A. Ishida (1984). "Capacitive Transducer for Continuous Measurement of Vertical Foot Force." *Med Biol Eng Comput* 22: 309-316.

Muhammad, H. B., et al. (2011). "Development of a bioinspired MEMS based capacitive tactile sensor for a robotic finger." *Sens Actuators A Phys* 165(2): 221-229.

Salpavaara, T., et al. (2009). "Wireless Insole Sensor System for Plantar Force Measurements During Sport Events." *XIX IMEKO World Congress Fundamental and Applied Metrology*: 2118-2123.

Wiegerink, R., et al. (2000). "Quasi-monolithic Silicon Load Cell for Loads Up to 1000 kg with Insensitivity to Non-Homogeneous Load Distributions." *Sens Actuators A Phys*: 189-196.

Yu, N., et al. (2005). "High-resolution capacitive load-displacement transducer and its application in nanoindentation and adhesion force measurements." *Rev Sci Instrum* 76(4).

What is claimed is:

1. A device for providing wireless load measurements, said device comprising:
   a. a two-component strain member composed of a spring body featuring one or more cantilever beams and a force transduction plate containing an indenter, said force transduction plate deforming the spring body out of a state of rest when a load is applied, wherein displacement of the force transduction plate is restricted to prevent overloading;
   b. a capacitive transducer for monitoring relative deformation of the force transduction plate, wherein said capacitive transducer is secured to a fixed region of the spring body, and the indenter within the force transduction plate displaces vertically into contact with the capacitive transducer, wherein said capacitive transducer generates an output signal in response to an applied load acting on the spring body;
   c. a polymeric and/or elastomeric coating on an external surface of the capacitive transducer;
   d. at least one accelerometer embedded within said wireless load cell, said at least one accelerometer generating an output signal in response to dynamic displacement of said wireless load cell;
   e. at least one signal processing device coupled with said capacitive transducer, and said at least one accelerometer, said at least one signal processing device being able to receive signal data from multiple sensors and to send a signal analogous with the output signal of the capacitive transducer and the at least one accelerometer; and
   f. at least one microcontroller unit that can process output signal data from the signal processing device and prepare it for wireless transmission.

2. The device of claim 1, wherein said capacitive transducer and said at least one accelerometer are further comprised in a microelectromechanical system.

3. The device of claim 1, wherein said device has a power supply comprising at least one power source from the group consisting of batteries, rechargeable batteries, radio frequency induction, electromagnetic induction, and piezoresistive elements.

4. The device of claim 1, wherein said microcontroller further includes at least one or more multi directional data transmission systems using wireless telemetry technology.

5. The device of claim 1, wherein said indenter is an object capable of vertical adjustment within the force transduction plate or is directly manufactured into the force transduction plate.

6. A device for providing wireless load measurements, said device comprising:
   a. a two-component strain member composed of a spring body featuring one or more cantilever beams and a force transduction plate containing an indenter, said force transduction plate deforming the spring body out of a state of rest when a load is applied, wherein the displacement of the force transduction plate is restricted to prevent overloading;
   b. a capacitive transducer for monitoring relative deformation of the force transduction plate, wherein said capacitive transducer is secured to a fixed region of the spring body, and the indenter within the force transduction plate displaces vertically into contact with the capacitive transducer, wherein said capacitive transducer generates an output signal in in response to an applied load acting on the spring body;
   c. a polymeric and/or elastomeric coating on an external surface of the capacitive transducer;
   d. at least one accelerometer embedded within said wireless load cell, said at least one accelerometer generating an output signal in response to dynamic displacement of said wireless load cell;
   e. at least one temperature sensor embedded within said wireless load cell, said at least one temperature sensor generating an output signal in response to a change of temperature in the environment in and around said wireless load cell;
   f. at least one signal processing device coupled with said capacitive transducer, said at least one accelerometer, and said at least one temperature sensor, said at least one signal processing device being able to receive signal data from multiple sensors and to send a signal analogous with the output signal of the capacitive transducer, the at least one accelerometer, and the at least one temperature sensor; and
   g. at least one microcontroller unit that can process output signal data from the signal processing device and prepare it for wireless transmission.

7. The device of claim 6, wherein said capacitive transducer, said at least one accelerometer and said at least one temperature sensor are further comprised in a microelectromechanical system.

8. The device of claim 6, wherein said device has a power supply comprising at least one power source from the group consisting of batteries, rechargeable batteries, radio frequency induction, electromagnetic induction, and piezoresistive elements.

9. The device of claim 6, wherein said microcontroller further includes at least one or more multi directional data transmission systems using wireless telemetry technology.

10. The device of claim 6, wherein said indenter is an object capable of vertical adjustment within the force transduction plate or is directly manufactured into the force transduction plate.

* * * * *